United States Patent [19]
Kennedy et al.

[11] Patent Number: 5,091,265
[45] Date of Patent: Feb. 25, 1992

[54] COATING COMPOSITIONS FOR GAME BALLS

[75] Inventors: Thomas J. Kennedy, Chicopee, Mass.; Alan D. Walker, Somers, Conn.

[73] Assignee: Lisco, Inc., Tampa, Fla.

[21] Appl. No.: 657,476

[22] Filed: Feb. 19, 1991

[51] Int. Cl.⁵ .................. B32B 25/00; C09K 11/06; A63B 39/00

[52] U.S. Cl. ................... 428/690; 273/58 A; 252/301.16; 252/301.35

[58] Field of Search ............... 273/58 A, 31; 252/301.16, 301.35; 428/690; 250/462.1

[56] References Cited

U.S. PATENT DOCUMENTS

| | | | |
|---|---|---|---|
| 4,304,706 | 12/1981 | Urs | 260/31.4 R |
| 4,666,949 | 5/1987 | Shimizu et al. | 521/114 |
| 4,720,403 | 1/1988 | Jasenof et al. | 427/327 |
| 4,866,116 | 9/1989 | Ek et al. | 524/430 |

Primary Examiner—James J. Seidleck
Assistant Examiner—Charles R. Nold

[57] ABSTRACT

A coating composition for game balls, such as baseballs and softballs, is provided. The coating composition is comprised of a specific film-forming binder system, a fluorescent pigment, at least one compatible solvent and additional components including texturizing and leveling agents. The various constituents of the coating composition are combined together in predetermined, relative proportions to produce a composition which, when applied to a game ball such as a softball, provides a coating having qualities including a bright fluorescent color, excellent durability and weather resistance, as well as a soft leathery texture.

35 Claims, 1 Drawing Sheet

COATING COMPOSITIONS FOR GAME BALLS

BACKGROUND OF THE INVENTION

The present invention is directed to the art of game ball construction, such as the construction of softballs and baseballs, and particularly to coating compositions suitable for use on such balls in order to enhance visibility, durability, and feel characteristics.

In this regard, the invention is particularly applicable to fluorescent coating compositions for softballs and other recreational game balls such as baseballs, and will be described with particular reference thereto. It will be appreciated, however, that the invention has broader applications and may be advantageously employed in other environments.

Painted and/or coated white and off-white softballs offer a less-than-optimal degree of visibility during both daytime and evening play. The white paint is generally comprised of 100 parts synthetic resin and approximately 20 parts pigments, resulting in a bright white coated softball having a soft feel texture. However, the white softballs tend to blend into the sky during daylight play, or get "lost" under the lights during evening play.

It has been determined over the years that fluorescent colored softballs are more apparent against the blue, gray and white colors of the daytime sky than are traditional white or off-white softballs. Also, fluorescent colored softballs afford extended visibility during night play as they can be readily seen under field lights and against the evening's black sky.

However, notwithstanding the above, fluorescent softballs of the prior art do not achieve the level of brightness or intensity desired. This stems from the processes utilized in applying the fluorescent pigment to the ball, as well as the compositions of the coatings.

Along this line, one of the prior art processes teaches combining a fluorescent pigment with a white tinting agent ($TiO_2$ or $BaSO_4$) in the same layer. While this method provides for some fluorescence, the color intensity does not achieve a level as high as that of the present invention.

In this regard, in order to enhance the color intensity and hide properties of the fluorescent pigment, various coating compositions were produced by the present inventors by increasing the ratio of fluorescent pigment to resin. However, such attempts produced coatings having inadequate paint adhesion and optimum feel properties at high pigment levels.

For example, the high pigment level-resin compositions were very glossy and exhibited a slippery feel. Since a "suede-like" feel and adequate paint adhesion are desired, a resin with high elongation properties (i.e. elasticity) was developed. However, although as a result of the strong impact and friction forces normally applied during play to the finished softballs and baseballs, strong adhesive properties are required, the resin also needed to exhibit maximum color intensity and hide capabilities. After many iterations were attempted in order to develop a coating composition which offered maximum adhesion and hide capabilities, while also providing optimum "soft touch" feel characteristics through the use of a tumbling process after coating, the coating compositions of the present invention were produced.

Since fluorescent pigments generally show poor hiding capabilities, the inventors new coating compositions, as well as the use of the new compositions in combination with a white substrate, provides for a brighter product. This is particularly true when the coating composition is utilized as a topcoat because the white substrate acts to brighten the fluorescent color.

A same or similar degree of brightness may be obtained by employing the same composition and/or two-coating method (i.e., applying a base coat of white followed by a top coat of fluorescent coating material of the present invention) on split leather, top grain leather, or synthetic materials. The white base coat may be a composition comprising vinyl, polyurethane or other compatible materials. The base coat is typically a knife-coated material.

As a result, game balls which are produced utilizing the coating compositions of the invention, have improved visibility, adhesion and feel properties over those ball constructed according to the prior art. The objects and advantages of the present invention are more particularly set forth below.

BRIEF DESCRIPTION OF THE DRAWING

A more complete appreciation of the invention and many of the attendant advantages thereof will be better understood by reference to the following detailed description when considered in connection with the accompanying drawing, wherein.

SUMMARY OF THE INVENTION

Figure 1:
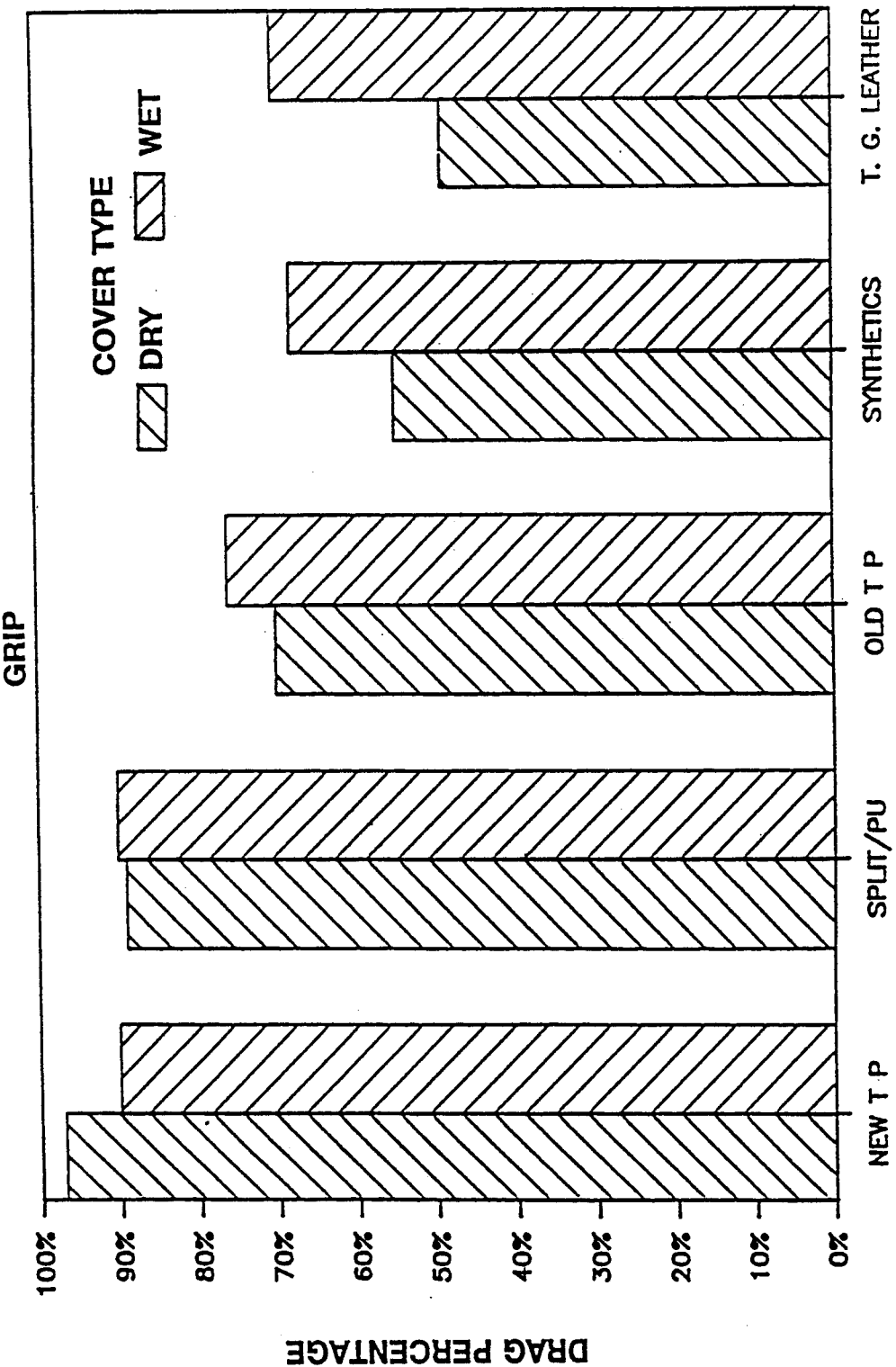
FIG. 1 is a chart demonstrating the drag percentage of a molded softball coated with the coating composition of the present invention ("New T.P.") in comparison with the prior art under both wet and dry playing conditions.

The present invention is directed to improved coating compositions for game balls, such as softballs and baseballs, in order to enhance the visibility, adhesion and feel properties of the finished balls. The coating compositions include a film forming binder comprised of a linear saturated polyester polyol resin having an average equivalent weight of about 900 to about 1500, combined with an aliphatic polyisocyanate resin cross-linking agent, a fluorescent pigment which is present in the ratio of about 85–90 parts by weight per 100 parts by weight of the film forming binder (and/or about 80 to about 110 parts by weight per 100 parts by weight of the polyester polyol resin), at least one compatible solvent, a texturizing agent and, in some instances, a flow control or leveling agent.

In addition, the present invention is directed to a process for enhancing the visibility, durability and feel characteristics of recreational or game balls, through the application of the coating compositions of the invention, as well as the coated, or finished, game balls produced thereby.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE INVENTION

The coating compositions of the present invention can be applied to a variety of different types of game balls used for both recreational and/or tournament play including, but not limited to, both molded and stitched-leather softballs and baseballs.

In most instances, the game balls will have a core and a cover, and the coating compositions will be applied onto the surface of the cover. While there are many options for molding a leather-like synthetic cover material upon a core, the preferred method is to slush cast and gel a vinyl plastisol cover into an open mold having a desired cover pattern, insert a pre-cemented urethane core, close the mold, fuse the vinyl, and then cool the fused cover so that the final product can be removed from the open mold.

Additional methods for manufacturing two-piece and/or one-piece molded balls are set forth in U.S. Pat. Nos. 4,725,058, 4,729,566 and 4,840,378, and are incorporated herein by reference. Although a two-piece molded ball is preferred, it is to be understood that it is within the scope of the invention, to apply the coating compositions directly to balls which comprise a single, spherical mass of core material.

Thus, the present invention is directed to improved coating compositions which can be applied to the surface of various types of game balls and no limitation is made as to the particular type of construction and/or materials utilized therein.

Along this line, the coating compositions can be applied to a wide variety of game balls such as various size softballs or baseballs, whether of traditional or restrictive flight construction. For example, in the preferred embodiments, the coating compositions of the invention can be applied to 11 or 12 inch circumference softballs produced according to both restricted, and traditional flight specifications.

Further, the new coating or paint compositions of the invention were specifically designed to maintain their bright color intensity well past normal expected life usage (i.e. beyond 1-2 games) under both wet and dry playing conditions. In this regard, the initial feel and grip of the finished coated balls were designed to simulate the grip features of the traditional white painted softball. This includes a tumbling process to "break in" or "roughen-up" the coated or painted surface to provide the "leather-like" feel, while maintaining the necessary drag features of the traditional ball.

The particular coating compositions of the present invention comprises primarily of a film forming binder and a fluorescent pigment. The film forming binder is of a two part urethane coating, including a specific polyester polyol resin having an average equivalent weight of about 900 to about 1500 (preferably about 1000) and a polyisocyanate cross-linking agent (hardener). The weight ratio of the polyester polyol resin to polyisocyanate cross-linking agent is about 3.5/1 to about 4/1.

The fluorescent pigment, or colorant, comprises of a solid solution of fluorescent dyes in a sulphonamide, triazine, aldehyde, and solvent resistant resin matrix. It has been found that the polyester polyol resin, when combined with the polyisocyanate resin to produce a film forming binder, is capable of being loaded with more than its own weight of fluorescent pigment (i.e. the pigment to polyester resin weight ratio is greater than 1, and the pigment to binder weight ratio is about 0.85–0.90), thereby enhancing color intensity.

When the polyester resin is cross-linked with the polyisocyanate resin a soft coating is produced. A crystalline polypropylene texturizing agent is added in order to provide a "suede- or leather- like" feel to the coating composition when applied to the surface of a game ball. Solvents and other coating additives are also included in accordance with conventional teachings.

When the coating composition is applied to the surface of various game balls, such as to the covers of softballs, and the balls are put through a specific cure cycle, balls exhibiting excellent feel and color characteristics are produced while maintaining and/or improving the mechanical strength, durability and weather resistance of the surface protective coating.

More particularly, the coating compositions of the present invention are comprised of a film forming agent (i.e. a binder comprised of the combination of a saturated polyester resin having a high equivalent weight and an aliphatic polyisocyanate resin suitable for cross-linking), a colorant, such as a daylight fluorescent pigment, at least one compatible solvent, and a number of additional components such as texturizing and leveling agents. The various constituents of the coating composition are combined together in predetermined, relative proportions to produce a composition which, when applied to the cover of a ball, such as a softball, provides a durable coating having a desirable fluorescent color and leathery texture.

As indicated above, the film forming agent, or binder, of the present invention is comprised of the combination of a polyester polyol resin and a polyisocyanate resin. The polyester polyol resin is a solvent-free linear saturated polyester resin such as that trademarked and sold by Mobay Corporation, Bayer, A.G., under the designation Desmophen TM 1652 (100% n.v. solids, OH number 56, average equivalent weight 1002).

According to the manufacturer, Desmophen TM 1652 exhibits the following typical properties:

| TYPICAL PROPERTIES* | |
|---|---|
| Appearance | Light yellow liquid |
| Solids, wt. % | 100 |
| OH content, % | 1.7 |
| Hydroxyl number | 56 |
| Acid number | 2.0 maximum |
| Water content, wt. % | 0.2 maximum |
| Color, Gardner | No. 3 maximum |
| Viscosity @ 20° C., mPa's | 12,000 |
| Equivalent wt., avg. (as supplied) | 1002 |
| Specific gravity @ 20° C. | 1.17 |
| Weight per gallon, lbs | 9.8 |
| Flash point (Pensky-Marten closed cup) | 392° F. (200° C.) |

*These items are provided by Mobay Corporation as general information only. They are approximate values and are not considered part of the production specification.

Of particular interest is the relatively high equivalent weight, i.e. the average equivalent weight of Desmophen TM 1650 is approximately 1000 (i.e. 1002), of the saturated polyester resin. This factor allows for a "soft feel" on the softball when the polyester is cross-linked with an isocyanate.

An example of an isocyanate suitable for cross-linking with the saturated polyester resin utilized in the present invention, is an aliphatic polyisocyanate resin, such as Desmodur TM N-75, also trademarked and sold by Mobay Corporation, Bayer, A.G. Desmodur TM N-75 is an aliphatic polyisocyanate resin based on hexamethylene diisocyanate (HDI) and dissolved in n-butyl acetate and xylene (1:1). According to Mobay, Desmodur TM N-75 exhibits the following product specifications and typical properties:

| PRODUCT SPECIFICATIONS | |
|---|---|
| Solids, wt. % | 75 ± 2 |
| NCO content, % | 16.0–17.0 |
| Color, Gardner | No. 3 maximum |
| Viscosity @ 20° C., mPa's | 100–250 |
| Free HDI monomer, % (based on solids) | 0.7 maximum |
| TYPICAL PROPERTIES* | |
| Appearance | Clear, slightly yellow liquid |
| Equivalent wt., avg. (as supplied) | 255 |
| Specific gravity @ 25° C. | 1.06 |
| Weight per gallon, lbs | 8.8 |
| Flash point (Setaflash) | 87° F. (31° C.) |

*These items are provided by Mobay as general information only. They are approximate values and are not considered part of the product specification.

In order to produce the properties desired by the present invention, it has been found that for approximately every 100 parts by weight of the polyester resin present in the coating composition, about 25 to about 28 parts of the isocyanate resin are included as well. In the preferred formulation of the present invention, approximated 26.7 parts by weight of the polyisocyantate resin is included with every 100 parts by weight of the polyester resin present in the coating composition.

The colorants suitable for use in the present compositions comprise generally of those special colorants known as daylight fluorescent pigments. These pigments absorb visible or ultraviolet light and re-emit the absorbed energy at long wavelengths. As a result, these pigments appear to glow in daylight, as the emitted light combines with the reflected color of the object.

It is generally thought that the active part of the fluorescent pigments consist of an organic molecule. Those that show fluorescence will also phosphorescence under certain conditions. In this regard, phosphorescence has an afterglow or prolonged emission, while fluorescence does not generally have this property.

Moreover, fluorescent pigments usually consist of the fluorescent compound combined with an appropriate resin matrix. Along this line, it has been found that fluorescent pigments such as the Radiant P7 Series (Radiant Color, Richmond, Calif.) or the Day-Glo GT type Series (Day-Glo Color Corp., Cleveland, Ohio) are particularly well suited for use in the softball coating compositions of the present invention. These types of fluorescent pigments are specifically suited for a solvent-borne paint system because of the chemically resistant support onto which the fluorescent dye is adsorbed.

In this regard, the Day-Glo T and GT Series pigments are based on a chemically resistant matrix (i.e. a solid solution of fluorescent dyes in a sulphonamide, triazine, aldehyde, solvent resistant resin matrix) which makes them insensitive to a wide variety of solvents. The fact that these pigments are based on a chemically resistant resin permits them to be used with other resins which require strong oxygenated types of solvents such as alcohols, esters or ketones. In addition, the thermoset nature of the pigments also enables them to be used in coatings, which are intended to be non-sticking on surface area subject to heat and pressure.

Since the GT Series pigments have higher strength and are ground slightly finer than the T Series pigments, the GT Series pigments can be used for toluene and alcohol/ester based coatings due to their color, strength and fine particle size. In this regard, it has been found that fluorescent pigments ranging in size from about 6 Hegman to about 7 Hegman are required to produce satisfactory color intensity in the present invention. The Radiant P7 Series pigments are general equivalent to those fluorescent pigments of the Day-Glo GT type series.

The preferred pigment to resin (or binder) ratio is from about 85 to about 90 parts by weight fluorescent pigments to 100 parts by weight of the combined polyester polyol and isocyanate resin, or about 80 to about 110 parts pigment (with 110 parts being the more preferred) to 100 parts polyester polyol resin. As can be seen, the ratio of weight percent pigment to weight percent fluorescent polyester resin is greater than 1, i.e. it is approximately 1.1.

The use of Radiant P7-OG0623 orange or Radiant P7-CH0620 chartreuse pigments in the compositions provides the desired level of fluorescence in the finished, coated softball product. Of course, the coating compositions are not limited to pigments which are chartreuse and orange in color, but can be comprised of pigments having other fluorescent colors such as pink, red, yellow, green, blue, magenta, etc.

The coating compositions produced according to the invention may also contain one or more solvents. The solvents utilized are those which are particularly compatible with the above indicated binding system and pigments. For example, the solvents compatible for use in the present invention include from about 75 to about 85 parts butyl acetate ($CH_3COOC_4H_9$) per 100 parts by weight polyester resin, from about 55 to about 65, parts toluene ($C_6H_5CH_3$) per 100 parts by weight polyester resin, and from about 55 to about 65 parts methyl isobutylketone (MIBK, $(CH_3)_2CHCH_2COCH_3$) per 100 parts by weight polyester resin. The preferred coating composition of the present invention comprises, by 100 parts by weight polyester resin, about 80 parts by weight butyl acetate, about 60 parts by weight toluene and about 60 parts by weight methyl isobutyl ketone. The total proportion of solvent is usually in the range from 40 to 65 percent by weight, based on the total weight of the coating composition.

The additional components present in the coating compositions comprise a texturizing agent that allows for improved grip on the softball and a leveling agent which enhances the application properties of the coating compositions. The texturizing agent is a crystalline polypropylene having a melting point of approximately 330° F., and a specific gravity of about 0.90. The crystalline polypropylene is a free flowing powder with a particle size of between about 25 and 75 microns, preferably between about 40 and 55 microns. The solvent resistance of the crystalline polypropylene texturizing agent enables it to be compatible with a wide variety of resin systems, both solvent and water based.

Examples of commercially available texturizing agents which can be used include Shamrock 5378, 5380, 5382 and 5384, all provided by Shamrock Technologies Inc. of Newark, N.J., Shamrock 5382 being preferred. The crystalline polypropylene provides a "suede- or leather- like" feel to the coating compositions when applied to a softball. It is easily dispersed among the remaining components of the coating compositions when subjected to high-speed mixing equipment The texturizing agent is present in the compositions in an amount of about 3.5 to about 4.5 per 100 parts of the polyester resin, with about 4 parts per 100 parts of the polyester resin being preferred.

The leveling agent is present at about 0 to about 0.5 of the polyester resin, with about 0.2 parts per 100 parts of the polyester resin being preferred. It is a nonionic fluorochemical surfactant (such as a fluoroaliphatic polymeric ester) which provides low surface tension in the coating system, thereby enhancing the coating's application properties. The preferred leveling agent is a fluoropolymer such as the Fluorad TM Coating Additive, FC-430, trademarked and sold by 3M, St. Paul Minn.

Additional additives commonly used in the formulation of coatings, such as anti-skinning agents, scratch and mar-proof additives, anti-flood agents, etc. may also be added a it is understood by those skilled in the art, as long as they do not deteriorate any of the above indicated desired properties.

It is suggested, that with the exception of the cross-linking agent, the materials which comprise the coating compositions be combined under a high speed disperser such as a Morhouse Cowels (Morhouse Industries, Fullerton, Calif.) or Hobart (Hobart Corporation, Troy, Ohio) high speed mixer. In this regard, the method for mixing the formulation of the coating compositions is surprisingly critical in that the material should be combined under a high speed disperser. If the materials are ball-milled or sand-milled, the fine grind that is achieved tends to decrease the amount of fluorescence that is seen. High speed mixing for approximately 0.5 hours at 3000 rpm is the preferred method. The cross-linking agent is then incorporated into the resultant compositions immediately prior to its application.

Once the coating has been applied to a surface of a softball by conventional methods, such as by spraying, the coated ball is set to cure. The coating compositions can be applied in one or more coats onto the substrate surface by applying films of a thickness advantageously between 25 and 60 micrometers. One of the design objectives of the paint formulation is to maintain approximately a 10 minute maximum cure time cycle by balancing the elongation characteristics of the formulation against the cure cycle goal. After curing, a coating of a thickness between 25 and 51 micrometers (1 to 2 mils) is obtained.

When applied to the cover of a traditional flight molded softball comprising of a polyurethane core and a vinyl resin cover and/or a restrictive flight softball, the coated softballs take on a number of characteristics which fall within the American Softball Association (A.S.A ) specifications. Specifically, the weight of the finished 12 inch balls ranges from 175-200 grams, and that of the finished 11 inch balls ranges from 160-175 grams. The coefficient of restitution (C.O.R.) for restrictive softballs is approximately 0.770 max at 88 fps for both 11 and 12 inch balls, and the coefficient of restitution for traditional softballs is 0.500 max at 88 fps for both 11 and 12 inch balls. The compressions range between 0.007 and 0.012.

The Sword Rocker Hardness of the coating is in the range of 10 to 12, with a tensile strength of 5000-5500. The percent elongation is between about 550 to 600. The solids comprise about 52% by weight of the coating.

Field tests (both simulated as well as actual game play) have verified that the fluorescent coatings described herein demonstrate good adhesion to a plastisol softball cover. Specifically, applying the adhesion test set forth in ASTM D-3359 (wherein on a 0-5 scale, 5=no lift, and 3=greater than 65% lift) the coating compositions of the present invention produced a rating of 5.

Furthermore, the coating compositions provide for good stamping quality and ink adhesion because of the oil loading capabilities of the pigment in the polyester resin. Also, the bright fluorescent color of the coatings when tested according to ASTM D 1729, with a side by side comparison with competitor products under exposure of northern daylight, cool white fluorescent, incandesent and ultra violet light at 330 nm., indicated that the coatings maintain their intensity well past normal expected life usage i.e., beyond one or two softball games.

The coating compositions of the present invention were designed to maintain appropriate product integrity concerning wet and dry conditions. When the coating is applied to the ball, the initial feel and grip are designed to simulate the grip features of the white-painted softball of the prior art.

Once the coating has been applied to a softball and allowed sufficient time to cure, the coated ball is subjected to a tumbling process to "break in" or roughen-up the painted surface to provide a desirable "leather-like" feel while maintaining the necessary drag features of the prior art white ball. This is demonstrated in the chart set forth in FIG. 1.

Specifically, FIG. 1 demonstrates the drag percentage of a two-piece molded softball coated with the coating compositions of the present invention (New Tournament Plus) in comparison with the prior art under both wet and dry playing conditions. In this regard Old T.P. refers to first generation Tournament Plus; Spilt/PU refers to stitched polyurethane coated split leather; Synthetic refers to polyurethane or poly vinyl chloride coated fabric; and T.G. refers to top grain leather. As indicated in FIG. 1, the new coating compositions of the present invention, exhibit enhanced grip properties under dry conditions and comparable grip properties under wet conditions.

Furthermore, as indicated above, the coating compositions of the present invention can also be applied to non-molded softballs.

It should be pointed out that for a 12 inch non-molded softball, the cover thickness is typically 0.040 to 0.060 inches, with a core diameter of 3.65-3.7 inches. The weight of such a core is from about 135 grams to about 150 grams. The cover can comprise stitched split leather, top grain leather, or a synthetic such as vinyl or urethane, and the core can comprise polyurethane foam, a foamed thermoplastic (e.g., Surlyn or EVA), wool windings or Kapok fiber.

The invention is further illustrated b the following specific non-limiting examples.

EXAMPLE 1

In preparing the coating composition of the present invention, the following components, in relative parts by weight, were combined under a high-speed Hobart mixer:

| COMPONENT | phr |
|---|---|
| Desmophen 1652 | 100.0 |
| Butylacetate | 80.0 |

-continued

| COMPONENT | phr |
| --- | --- |
| Toluene | 60.0 |
| MIBK (Methyl Isobutyl Ketone) | 60.0 |
| Shamrock 5382 Texture (50 micron) | 4.0 |
| 3M FC-430 | 0.2 |
| Radiant P7-OG0623 (orange) or Radiant P7-CH0620 (chartreuse) | 110.0 |

The components were mixed in the high speed mixer for approximately 0.5 hours at 3000 rpm. Prior to application of the resultant compositions, the cross-linking agent (Desmodur TM 26.7 phr) was added to the composition. The resultant composition was then applied by conventional spray process to 11 inch softballs comprising a core center and a white polyol cover. After being allowed to cure, the coated softballs were subjected to an appropriate amount of tumbling and took on a desirable leathery feeling. The visibility and high color intensity of the resulting fluorescent softballs were noticeably improved over the prior art fluorescent softballs under ASTM D-1729. The final softballs weighed approximately 172 grams.

While the above formulation is the preferred formulation and coating process of the coating composition of the present invention, it is well understood in the art that the Day-Glo Series GT pigments discussed above may be readily substituted for the Radiant pigments without adversely effecting the finished results produced thereby.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described our invention, we claim:

1. A coating composition for a game ball, comprising:
    a film forming binder, wherein said binder includes a linear saturated polyester polyol resin having an average equivalent weight of approximately 900 to 1500, and an aliphatic polyisocyanate cross-linking agent; and,
    a fluorescent pigment, wherein said fluorescent pigment is present in a ratio of about 8514 90 parts by weight per 100 parts by weight of the film forming binder.

2. The coating composition for a game ball set forth in claim 1, wherein the polyisocyanate cross-linking agent is present in the film forming binder at about 25 to about 28 parts by weight per about 100 parts by weight of the polyester polyol resin.

3. The coating composition for a game ball set forth in claim 1, wherein the ratio of the weight percent of the fluorescent pigment to the polyester polyol is greater than 1.

4. The coating composition for a game ball set forth in claim 1, wherein the ratio of the weight percent of the fluorescent pigment to the polyester polyol is about 1.1.

5. The coating composition for a game ball set forth in claim 1, wherein the fluorescent pigment is present in a ratio of about 80 to about 110 parts by weight per 100 parts by weight of the polyester polyol resin.

6. The coating composition of claim 1, wherein said fluorescent pigment is comprised of a solid solution of fluorescent dyes in a sulphonamide, triazine, aldehyde and solvent resistant matrix.

7. The coating composition of claim 1, wherein said fluorescent pigment has a particle size of about 6 Hegman to about 7 Hegman.

8. The coating composition for a game ball set forth n claim 1, further comprising a texturizing agent.

9. The coating composition for a game ball set forth in claim 8, wherein the texturizing agent is a crystalline polypropylene powder having a particle size between about 25 and 75 microns.

10. The coating composition for a game ball set forth in claim 8, wherein the texturizing agent is present in the composition at about 4 parts by weight per 100 parts by weight of the polyester polyol resin.

11. The coating composition for a game ball set forth in claim 1, further comprising at least one compatible solvent.

12. The coating composition of claim 11, wherein said solvent is selected from the group consisting of butylacetate, toluene and methyl isobutyl ketone.

13. The coating composition for a game ball set forth n claim 1, further comprising a leveling agent.

14. The coating composition of claim 13, wherein the leveling agent is a fluoropolymer present in the composition at approximately 0.2 parts by weight per 100 parts by weight of the polyester polyol resin.

15. A game ball coated by the coating composition of claim 1.

16. A softball coated by the coating composition of claim 1.

17. A method for coating a game ball comprising the step of coating a surface of a game ball with a coating composition including a film forming binder comprised of a combination of a linear saturated polyester resin having an equivalent weight of about 900 to about 1500 and an aliphatic polyisocyanate cross-linking agent; a fluorescent pigment comprised of a solid solvent resistant solution of fluorescent dyes in a sulphonamide, triazine, aldehyde and solvent resistant resin matrix; at least one compatible solvent and a crystalline polypropylene texturizing agent, said fluorescent pigment is present in a ratio of about 85–90 parts by weight per 100 parts by weight of the film forming binder.

18. The method of claim 17, wherein the fluorescent pigment to polyester polyol resin ratio is greater than 1.

19. The method of claim 17, wherein the fluorescent pigment is present n a ratio of about 85 to about 90 parts by weight per 100 parts of the film forming binder.

20. The method of claim 17, wherein the fluorescent pigment has a particle size of about 6 Hegman to about 7 Hegman.

21. A game ball produced according to claim 17.

22. A softball produced according to claim 17.

23. A coating composition for a softball comprising:
    a film forming binder, wherein said binder includes a linear saturated polyester polyol resin having an average molecular weight of about 800 to about 1500, and an aliphatic polyisocyanate cross-linking agent;
    a fluorescent pigment, wherein the ratio of the weight percent of the fluorescent pigment to the polyester polyol is greater than 1.

24. The coating composition of claim 23, further comprising at least one compatible solvent.

25. The coating composition of claim 24, further comprising a crystalline polypropylene texturizing agent.

26. The coating composition of claim 25, further comprising a leveling agent.

27. A softball coated by the composition of claim 23.

28. A softball coated by the composition of claim 24.

29. A softball coated by the composition of claim 25.

30. A softball coated by the composition of claim 26.

31. A softball comprising:

a core; and a coating composition including a film forming binder comprised of a polyester polyol resin having an average equivalent weight of about 900 to about 1500 and a polyisocyanate cross-linking agent;

at least one compatible solvent; and a fluorescent pigment wherein the pigment is present n a ratio of about 85-90 parts by weight per 100 parts by weight of the film forming binder.

32. The softball of claim 31, wherein said coating composition further comprises of a texturizing agent.

33. The softball of claim 32, wherein the texturizing agent is a crystalline polypropylene powder having a particle size between about 25 and 75 microns.

34. The softball of claim 31, wherein said coating composition further comprises of a leveling agent.

35. The softball of claim 34, wherein the leveling agent is a fluoropolymer present in the composition at approximately 0.2 parts by weight per 100 parts by weight of the polyester resin.

* * * * *

UNITED STATES PATENT AND TRADEMARK OFFICE
CERTIFICATE OF CORRECTION

PATENT NO. : 5,091,265
DATED : FEBRUARY 25, 1992
INVENTOR(S) : THOMAS J. KENNEDY AND ALAN D. WALKER

It is certified that error appears in the above-identified patent and that said Letters Patent is hereby corrected as shown below:

In claim 1, column 9, line 48, delete "8514 90" and insert --85-90-- therefor.

Signed and Sealed this

Twenty-third Day of November, 1993

Attest:

BRUCE LEHMAN

*Attesting Officer*     *Commissioner of Patents and Trademarks*